(12) United States Patent
Doi et al.

(10) Patent No.: US 7,612,479 B2
(45) Date of Patent: Nov. 3, 2009

(54) SCANNER FOR EQUALIZING TORQUE CONSTANT AND REDUCING TORQUE CONSTANT VARIATION

(75) Inventors: Akira Doi, Hitachinaka (JP); Haruaki Otsuki, Hitachinaka (JP); Atsushi Sakamoto, Hitachinaka (JP); Souichi Toyama, Ebina (JP); Yaichi Okubo, Ebina (JP)

(73) Assignee: Hitachi Via Mechanics, Ltd., Ebina-shi (JP)

( * ) Notice: Subject to any disclaimer, the term of this patent is extended or adjusted under 35 U.S.C. 154(b) by 360 days.

(21) Appl. No.: 11/473,110

(22) Filed: Jun. 23, 2006

(65) Prior Publication Data

US 2007/0007828 A1    Jan. 11, 2007

(30) Foreign Application Priority Data

Jun. 24, 2005   (JP)   ............................. 2005-184253

(51) Int. Cl.
*H02K 21/12* (2006.01)
(52) U.S. Cl. .................................... 310/156.38; 310/36
(58) Field of Classification Search .................. 310/15, 310/36, 156.38; 335/272
See application file for complete search history.

(56) References Cited

U.S. PATENT DOCUMENTS

| | | | | | |
|---|---|---|---|---|---|
| 3,504,209 | A | * | 3/1970 | Russell | 310/171 |
| 5,654,600 | A | * | 8/1997 | Nomura et al. | 310/68 B |
| 5,682,073 | A | * | 10/1997 | Mizuno | 310/165 |
| 6,081,058 | A | * | 6/2000 | Suzuki et al. | 310/156.45 |
| 6,664,688 | B2 | * | 12/2003 | Naito et al. | 310/156.01 |
| 6,809,451 | B1 | * | 10/2004 | Brown | 310/156.08 |
| 6,982,504 | B2 | * | 1/2006 | Brown | 310/36 |
| 7,411,329 | B2 | * | 8/2008 | Murakami et al. | 310/156.45 |

FOREIGN PATENT DOCUMENTS

| | | |
|---|---|---|
| JP | 2003-307700 A | 10/2003 |
| JP | 2004-88855 A | 3/2004 |

* cited by examiner

*Primary Examiner*—Michael C Zarroli
(74) *Attorney, Agent, or Firm*—Crowell & Moring LLP

(57) ABSTRACT

A scanner has a rotor, and a stator disposed in the outside of the rotor. The rotor includes a shaft, and a permanent magnet mounted on the outer circumferential side of the shaft. The stator includes a casing, a yoke held in the inner circumferential side of the casing, and coils disposed in the inner circumferential side of the yoke. The permanent magnet of the rotor has radially depressed grooves formed in its outer circumferential portion. The torque constant of the scanner is circumferentially equalized by the grooves.

5 Claims, 5 Drawing Sheets

SCANNER FOR EQUALIZING TORQUE CONSTANT AND REDUCING TORQUE CONSTANT VARIATION

BACKGROUND OF THE INVENTION

The present invention relates to a scanner and particularly relates to a scanner which makes fluctuation movement by a micro-angle.

An example of a galvanometric scanner according to the background art has been disclosed in JP-A-2003-307700. As typically shown in FIG. 4, in the scanner disclosed in JP-A-2003-307700, a coil and permanent magnets are disposed circumferentially only in the fluctuation range of the galvanometric scanner. On this occasion, the coil is disposed on the rotor side and the permanent magnets are disposed on the stator side. The outer diameters of the coil and the permanent magnets are substantially constant.

On the other hand, an example of a DC motor provided with permanent magnets disposed around a rotation shaft has been described in JP-A-2004-88855. According to JP-A-2004-88855, permanent magnets are disposed in a surface of a rotor opposite to a stator in order to suppress distortion of an induced voltage as well as to suppress characteristic change caused by demagnetization. Moreover, grooves with a shape inclusive of a linear shape are formed axially in surfaces of the permanent magnets opposite to the stator so as to be near the magnetic pole boundaries of the permanent magnets.

In the background-art galvanometric scanner, there is the possibility that uniform torque cannot be obtained because the torque constant varies according to the rotation angle. That is, if the outer diameter of the permanent magnets forming the rotor is set to be substantially constant, magnetic flux density substantially describes a parabola in which the magnetic flux density is maximized in a circumferential center position of each permanent magnet and reduced toward opposite circumferential end portions of the permanent magnet. As a result, in the case of a four-pole DC motor, the torque constant is reduced by about 10% when the rotation angle changes by 15 degrees. This can apply to the DC motor described in JP-A-2004-88855.

SUMMARY OF THE INVENTION

The present invention is designed in consideration of the disadvantage in the background art. An object of the invention is to provide a scanner in which variation in torque constant in accordance with the rotation angle is reduced. Another object of the invention is to provide a scanner which is configured simply but the torque constant is equalized.

To achieve the foregoing objects, according to an aspect of the invention, there is provided a scanner having a rotor, and a stator disposed in the outside of the rotor, the rotor including a shaft, and a permanent magnet mounted on the outer circumferential side of the shaft, the stator including a casing, a yoke held in the inner circumferential side of the casing, and coils disposed in the inner circumferential side of the yoke, wherein the permanent magnet of the rotor has radially depressed grooves formed in its outer circumferential portion so that the torque constant of the scanner is circumferentially equalized by the grooves.

In this aspect, preferably, the permanent magnet has poles provided in a circumferential direction of the shaft; the grooves of the permanent magnet are formed so as to correspond to the poles of the permanent magnet; and the circumferential length of each groove is different by a range of from −10 degrees to +10 degrees from the circumferential length of corresponding one of the coils. Second coils may be disposed in the grooves formed in the permanent magnet. The number of the grooves of the permanent magnet may be twice as many as the number of the poles of the permanent magnet. The circumferential width of each of the grooves of the permanent magnet may be selected to be larger than the fluctuation angle of the shaft.

To achieve the foregoing objects, according to another aspect of the invention, there is provided a scanner having a rotor formed from permanent magnets having N poles and S poles disposed alternately in a circumferential direction, wherein each of the permanent magnets forming the N poles and the S poles is formed so that the outer diameter of a circumferential intermediate portion of the permanent magnet is smaller than the outer diameter of a circumferential end portion of the permanent magnet.

In this aspect, preferably, the intermediate portion and opposite end portions of each permanent magnet form part of concentric circles. Each permanent magnet may further have small-diameter portions which are formed in such a manner that a portion with a diameter substantially equal to those of the opposite end portions is formed in the intermediate portion smaller in diameter. The intermediate portion of each permanent magnet may have a circumferential length larger than the fluctuation range of the rotor. A stator may be disposed opposite to the rotor, and coils may be disposed in positions of the stator opposite to the small-diameter portions of the permanent magnets so as to protrude inward.

According to the invention, variation in torque constant in accordance with the rotation angle can be reduced because the outer diameter of the permanent magnet forming the rotor is changed in accordance with the circumferential position of the permanent magnet. Accordingly, improvement in positioning accuracy or reduction in positioning time can be attained.

DESCRIPTION OF THE PREFERRED EMBODIMENTS

Some embodiments of the invention as to a scanner will be described below with reference to the drawings. Although a galvanometric scanner used in a laser beam machine will be described as an example in these embodiments, the invention can be applied to other scanners such as a positioning scanner.

Embodiment 1

Figure 1:
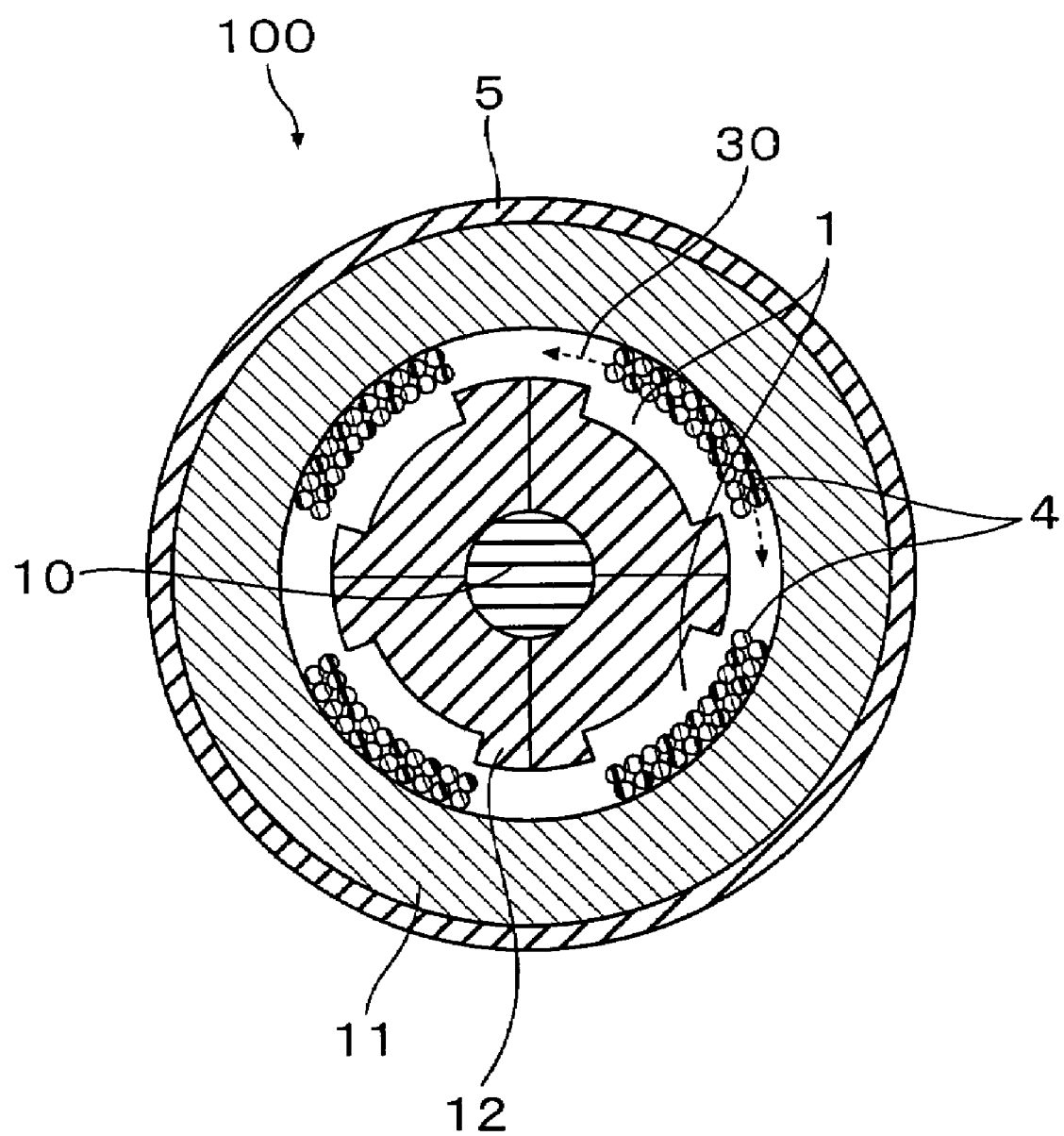
FIG. 1 is a transverse sectional view of a scanner according to an embodiment of the invention.
Figure 2:
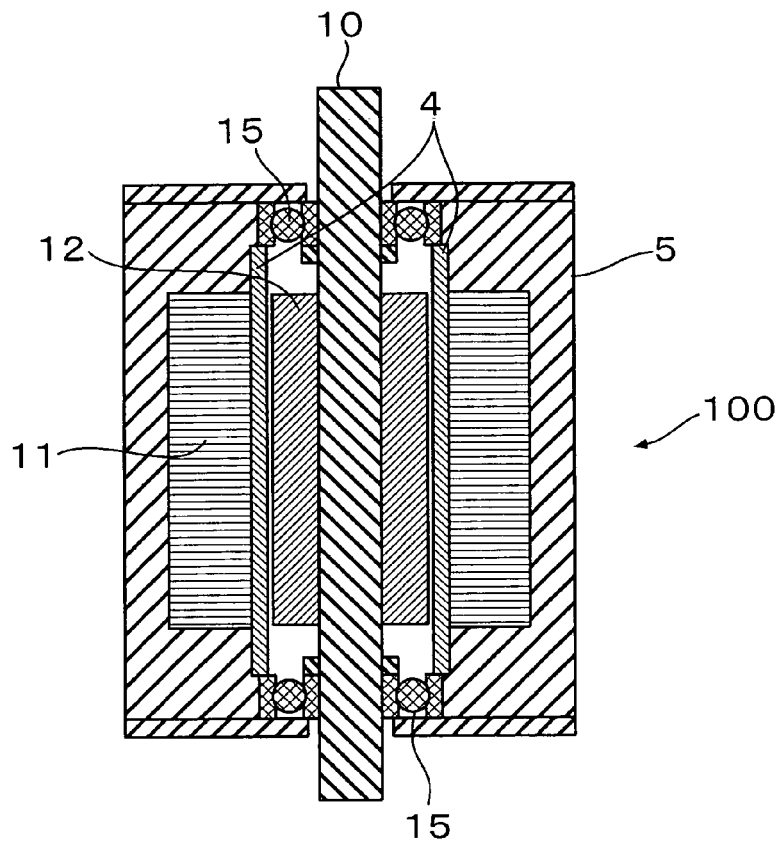
FIG. 2 is a longitudinal sectional view of the scanner depicted in FIG. 1.

FIG. 1 is a transverse sectional view of a scanner 100 according to an embodiment of the invention. FIG. 2 is a longitudinal sectional view of the scanner 100 in a state where a galvanometric mirror is removed. A four-pole permanent magnet 12 having N poles and S poles arranged alternately is mounted on the outer circumferential side of a shaft 10. The shaft 10 and the permanent magnet 12 are integrated with each other to form a rotor. A stator is disposed at a radial distance from the rotor. The stator includes an outer circumferential cylinder 5 shaped like a pipe, a ring-like yoke 11 attached to the inside of the outer circumferential cylinder 5, and coils 4 disposed at circumferential places in the inside of the yoke 11. Bearings 15 support opposite end portions of the shaft 10. The bearings 15 are held in the outer circumferential cylinder 5. Because the permanent magnet has four poles, the coils 4 are disposed at four circumferential places approximately at intervals of a 90 degrees pitch.

The permanent magnet 12 as characteristic of the invention is provided with grooves 1 which are formed in its outer circumferential portion to reduce variation in torque constant in accordance with the rotation angle. To meet requirement of angle dependence of the torque constant, the sizes of the grooves 1 and the coils 4 are optimized as follows.

Figure 3:
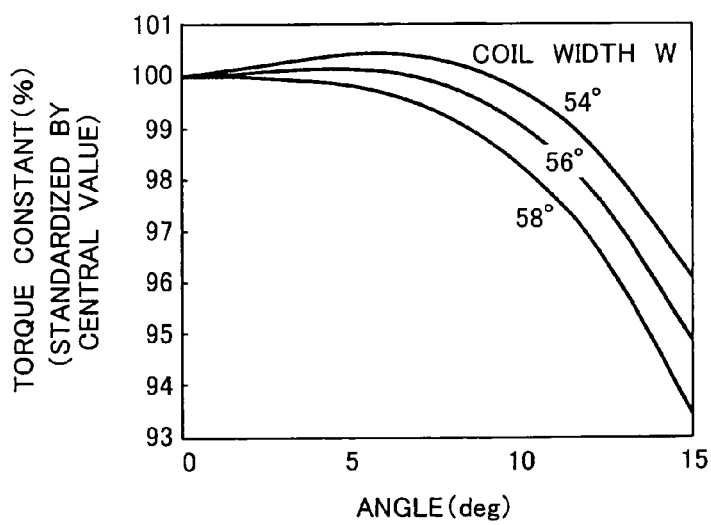
FIG. 3 is a graph showing an example of calculation of the torque constant of the scanner according to the invention.

FIG. 3 shows change in torque constant in the case where a neodymium-based magnet is used as the permanent magnet and provided with the grooves 1 each having a groove width of 54 degrees and formed to have a depth equal to 3.4% as large as the outer diameter of the permanent magnet. In FIG. 3, the width W of a coil 4 provided in a position opposite to a groove 1 is expressed as a parameter. The width W takes 54 degrees, 56 degrees and 58 degrees. The size of the permanent magnet 12 used in the scanner 100 depends on the size of a drive mirror etc. but is generally in a range of from about 5 mm to about 40 mm in terms of diameter. Accordingly, the depth equal to 3.4% as large as the outer diameter of the permanent magnet is equivalent to a value of from 0.17 mm to 1.36 mm.

To suppress variation in torque constant of the scanner 100 in accordance with the fluctuation angle to the utmost, it is known from FIG. 3 that the width of each groove is preferably set at 56 degrees in the condition that the fluctuation angle of the scanner 100 is in a range of ±5 degrees. That is, when the groove width is set at 56 degrees, variation in torque is not larger than 0.1% in the condition that the fluctuation angle is in a range of ±5 degrees. In the case where a large fluctuation angle mirror with a fluctuation angle in a range of ±10 degrees is used, variation in torque can be suppressed when the width of each groove 1 is set at 54 degrees. In this case, variation in torque can be reduced to be not larger than 0.3%.

Figure 4:
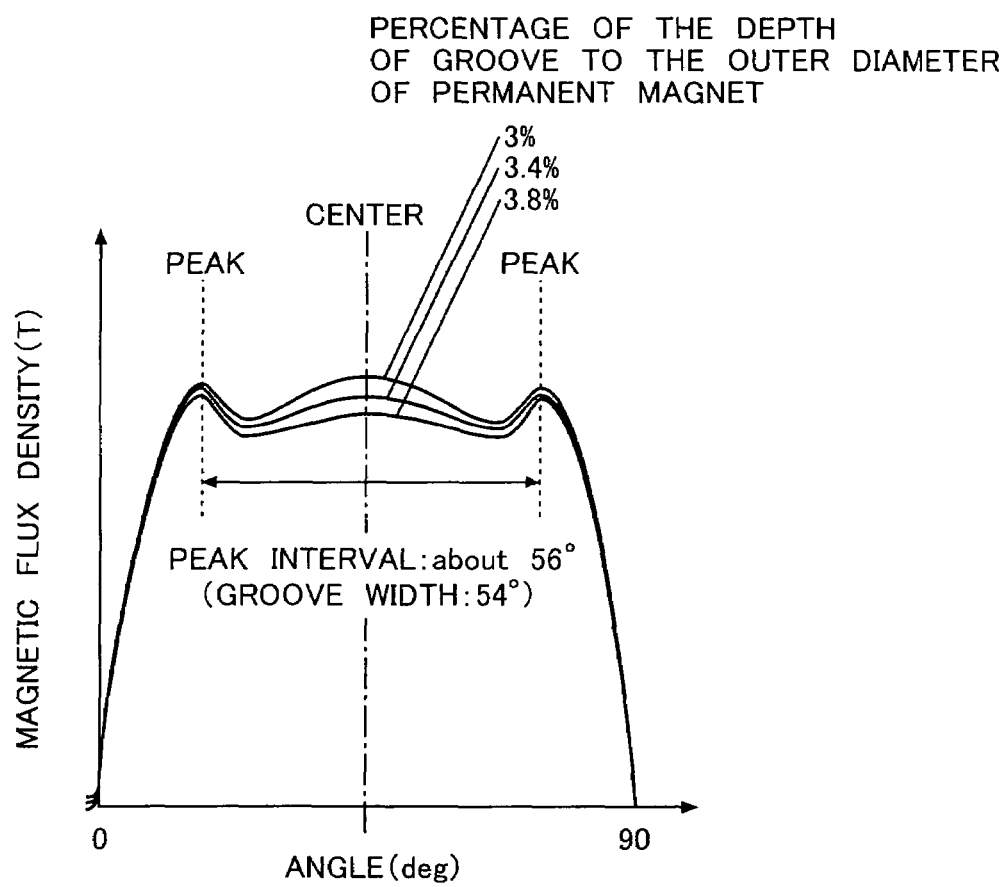
FIG. 4 is a graph showing an example of the radial magnetic flux density distribution of the scanner according to the invention.

Incidentally, in calculation shown in FIG. 3, radial magnetic flux density of the coils 4 is calculated and the depth of each groove 1 is adjusted so that the magnetic flux density distribution at each peak becomes laterally symmetric. Details of the adjustment will be described with reference to FIGS. 4 and 5. FIG. 4 shows an example of calculation of the radial magnetic flux density distribution of each coil portion 4. In FIG. 4, the direction represented by the arrows 30 in FIG. 1 is taken as the horizontal axis and a result of calculation of magnetic flux density in the position is taken as the vertical axis. Magnetic flux density is calculated in the case where each groove 1 has a width of 54 degrees and a depth equal to 3%, 3.4% and 3.8% as large as the outer diameter of the permanent magnet 12.

If there is no groove 1 formed in the permanent magnet 12, the magnetic flux density substantially describes a parabola with a peak in the circumferential center portion of the permanent magnet 12. On the contrary, in the embodiment where each groove 1 is formed in the permanent magnet 12, the magnetic flux density describes a three-hump-shaped curve having local maximum values in the center of the permanent magnet 12 and in positions near the circumferential end portions of the permanent magnet 12. Among the local maximum values, the local maximum values near the circumferential end portions are referred to as "peaks". Change in magnetic flux density in positions near the peaks is larger than that in the center portion. In the portion where each groove 1 is formed, reduction in magnetic flux density is observed as a whole. As is obvious from FIG. 4, the quantity of reduction in magnetic flux density can be adjusted when the depth of each groove 1 is changed. Although peaks of magnetic flux density appear in positions near end portions of each groove 1, the interval between the peaks is about 56 degrees which is slightly larger than the width 54 degrees of the groove 1.

Figure 5:
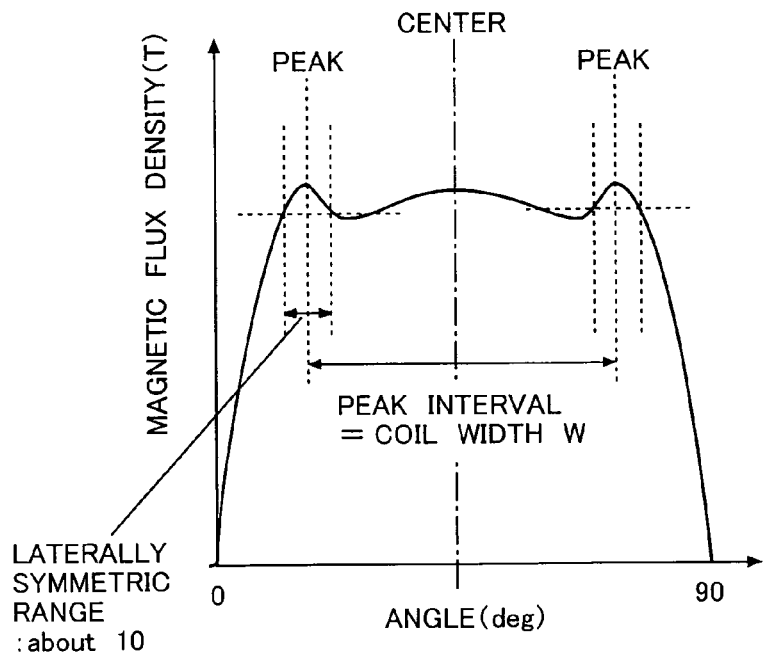
FIG. 5 is a graph showing an example of the radial magnetic flux density distribution of the scanner according to the invention.

FIG. 5 shows an example in which the depth of each groove 1 is set at 3.4% as large as the outer diameter of the permanent magnet 12 so that the magnetic flux density distribution in the vicinity of each peak is closest to line symmetry. In the magnetic flux density distribution obtained in this condition, the magnetic flux density distribution in the vicinity of each peak is substantially symmetric in a range of ±5 degrees from the peak when attention is paid to the magnetic flux density distribution in the vicinity of each peak. For calculation of the torque constant of the scanner 100, the magnetic flux density is generally averaged by the width of each coil 4 and evaluated. From this fact, it is supposed that variation in torque constant in accordance with the rotation angle can be suppressed to the utmost in a range of ±5 degrees from the peak when the width of each coil 4 is selected to be equal to the interval 56 degrees between the peaks.

Incidentally, in the torque constant distribution graph shown in FIG. 3, variation in torque constant in accordance with the rotation angle is small when the width of each coil 4 is 56 degrees. When the fluctuation angle is within a range of 5 degrees, variation in torque is not larger than 0.1%. This reason is because magnetic flux density is laterally symmetric with respect to each peak. That is, the range where variation in torque constant is small is coincident with the range where the magnetic flux density distribution is symmetric with respect to each peak. By forming the grooves 1 in the permanent magnet 12 as described above, variation in torque can be reduced to a value not larger than 1/10 as large as that in the case where there is no groove formed in the permanent magnet 12.

While the width W of each coil 4 is further changed, the torque constant is evaluated. In this case, optimum uniformity of the torque constant can be obtained when the coil width W is selected from a range of about ±10 degrees from the width of each groove 1 in terms of circumferential angle. Although this embodiment has been described on the case where the permanent magnet 12 has four poles, the same effect as in this embodiment can be obtained also in the case where the permanent magnet had two poles, six poles, or the like.

Embodiment 2

Figure 6:
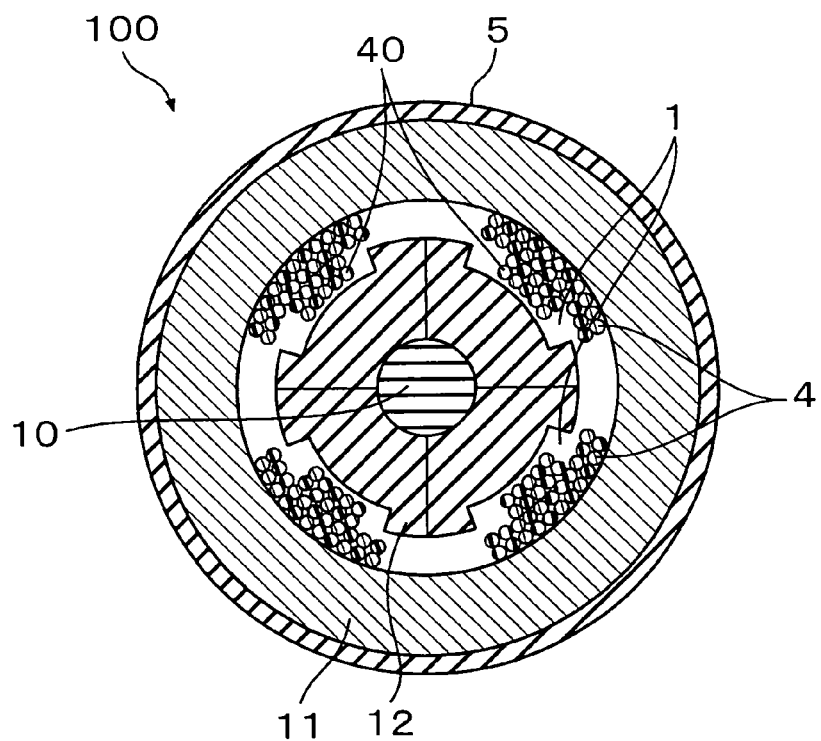
FIG. 6 is a transverse sectional view of a scanner according to another embodiment of the invention.

FIG. 6 is a transverse sectional view of a scanner according to another embodiment of the invention. This embodiment is different from the previous embodiment in the shape of each coil disposed opposite to the permanent magnet 12. Second coils 40 each having a circumferential length smaller than one coil 4 are additionally disposed in the inside of the coils 4, specifically, substantially in the respective center portions of the coils 4 disposed at intervals of an approximately equal pitch in the inner circumference of the yoke 11. Each second coil 40 is disposed so as to encroach on a corresponding groove 1 formed in the permanent magnet 12 opposite to the second coil 40. Because the second coils 40 are disposed so as to encroach on the grooves 1 respectively, the range of fluctuation of the shaft 10 is limited. Because the second coils 40 are added, the sum of numbers of turns in the coils 4 and the second coils 40 is however increased so that the torque constant can be increased. Moreover, according to this embodiment, reduction in magnetic flux density in the center portion of each groove 1 in Embodiment 1 can be recovered to compensate for slight lowering of the torque constant in the center portion of each groove 1.

Embodiment 3

Figure 7:
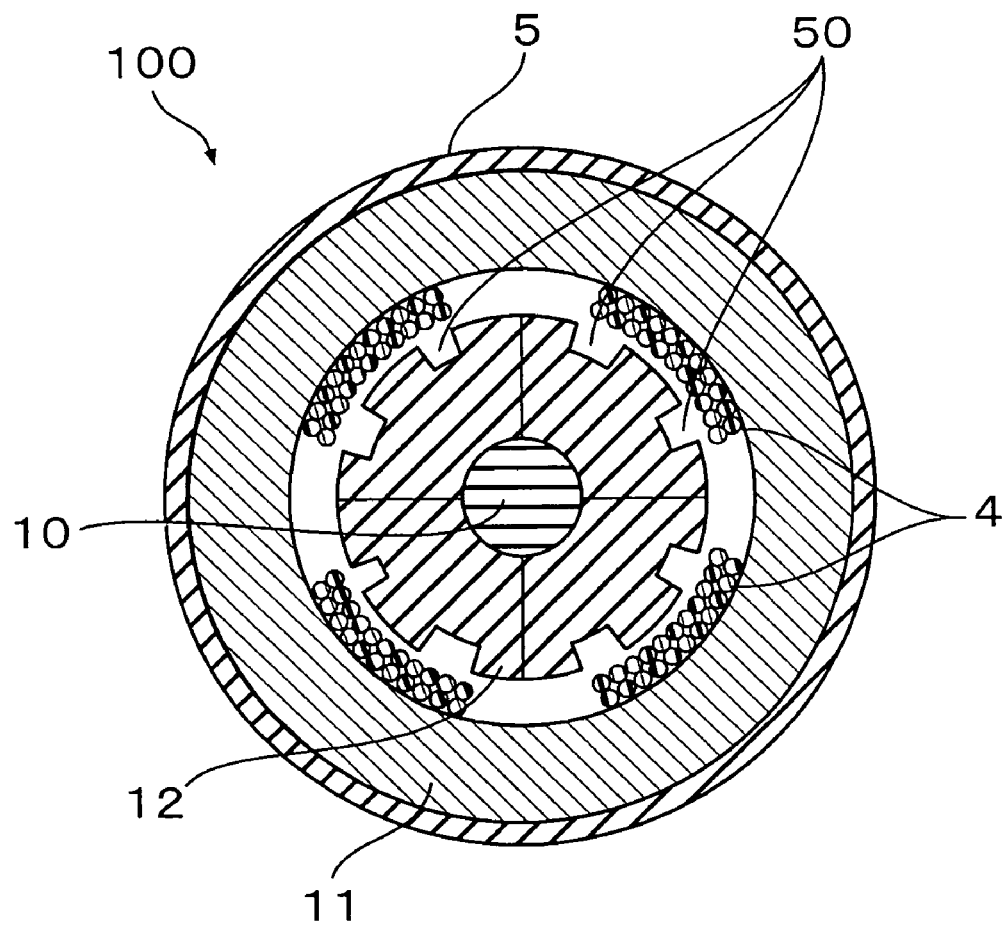
FIG. 7 is a transverse sectional view of a scanner according to a further embodiment of the invention.

FIG. 7 is a transverse sectional view of a scanner 100 according to a further embodiment of the invention. This embodiment is different from the previous embodiment in that each of the grooves 1 provided in the permanent magnet 12 is replaced with two grooves 50 each having a small width. In the scanner 100 according to Embodiment 1, magnetic flux density in the circumferential center portion of each groove 1 is slightly reduced so that the torque constant is slightly reduced because the radius of the outer circumferential surface of each groove 1 is selected to be substantially constant. To avoid this disadvantage, in this embodiment, there is no groove formed in the center portion of the permanent magnet 12 but grooves 50 are formed in positions near the circumferential end portions of the permanent magnet 12. As shown in FIG. 4, because each groove formed in the permanent magnet 12 plays a role of generating a peak of magnetic flux density, reduction in magnetic flux density in the center of the permanent magnet 12 is suppressed when the groove formed in the center portion is eliminated. As a result, reduction in torque constant is reduced. On this occasion, the width of each groove 50 is selected to be at least larger than the range of fluctuation of the scanner 100.

In each of the aforementioned embodiments, the permanent magnet contained in the rotor of the scanner has a plurality of poles. The number of poles may be two or may be four or more. Although each of the aforementioned embodiments has been described on the case where the permanent magnet is disposed on the whole circumference of the shaft, permanent magnets may be disposed circumferentially partially in consideration of the fluctuation range.

What is claimed is:

1. A scanner which makes a fluctuation movement in a predetermined range, comprising:
a rotor formed from permanent magnets having N poles and S poles disposed alternately in a circumferential direction and having a shaft, and
a stator disposed outside of the rotor and having a casing, a yoke held at the inner circumferential side of the casing, and coils disposed at the inner circumferential side of the yoke;
wherein each of the permanent magnets forming the N poles and the S poles is configured such that an outer diameter, which is centered about the rotor shaft, of a circumferential intermediate portion of each permanent magnet is smaller than the outer diameter of a circumferential end portion thereof.

2. A scanner according to claim 1, wherein the intermediate portion and opposite end portions of each permanent magnet form part of concentric circles.

3. A scanner according to claim 1, wherein the intermediate portion of each permanent magnet has a circumferential length larger than the fluctuation range of the rotor.

4. A scanner according to claim 1, further comprising coils disposed in positions of the stator, which is disposed opposite to the rotor, opposite to the small-diameter portions of the permanent magnets so as to protrude inward.

5. A scanner comprising:
a rotor formed from permanent magnets having N poles and S poles disposed alternately in a circumferential direction,
wherein each of the permanent magnets forming the N poles and the S poles is formed so that the outer diameter of a circumferential intermediate portion of the permanent magnet is smaller than the outer diameter of a circumferential end portion of the permanent magnet, and
wherein each permanent magnet further has small-diameter portions which are formed in such a manner that a portion with a diameter substantially equal to those of the opposite end portions is formed in the intermediate portion smaller in diameter.

* * * * *